(12) United States Patent
Gong et al.

(10) Patent No.: US 12,063,940 B2
(45) Date of Patent: *Aug. 20, 2024

(54) ICE-FREE MEAT FRESH-PRESERVATION CONTROL METHOD, CONTROLLER, AND REFRIGERATOR

(71) Applicants: HEFEI HUALING CO., LTD., Anhui (CN); HEFEI MIDEA REFRIGERATOR CO., LTD., Anhui (CN); MIDEA GROUP CO., LTD., Guangdong (CN)

(72) Inventors: Qinqin Gong, Anhui (CN); Huixin Shi, Anhui (CN); Zhigang Wu, Anhui (CN); Zhifang Ning, Anhui (CN)

(73) Assignees: HEFEI HUALING CO., LTD., Anhui (CN); HEFEI MIDEA REFRIGERATOR CO., LTD., Anhui (CN); MIDEA GROUP CO., LTD., Guangdong (CN)

( * ) Notice: Subject to any disclaimer, the term of this patent is extended or adjusted under 35 U.S.C. 154(b) by 1264 days.

This patent is subject to a terminal disclaimer.

(21) Appl. No.: 16/611,795

(22) PCT Filed: Jun. 30, 2017

(86) PCT No.: PCT/CN2017/091134
§ 371 (c)(1),
(2) Date: Jun. 8, 2020

(87) PCT Pub. No.: WO2018/205384
PCT Pub. Date: Nov. 15, 2018

(65) Prior Publication Data
US 2023/0217938 A1    Jul. 13, 2023

(30) Foreign Application Priority Data
May 9, 2017 (CN) .......................... 201710323015.5

(51) Int. Cl.
*A23B 4/08*     (2006.01)
(52) U.S. Cl.
CPC .................................... *A23B 4/08* (2013.01)
(58) Field of Classification Search
CPC ........................................................ A23B 4/08
(Continued)

(56) References Cited

U.S. PATENT DOCUMENTS 8,061,150 B2    11/2011   Kim et al.
8,397,521 B2    3/2013   Kim et al.
(Continued)

FOREIGN PATENT DOCUMENTS

CN    101358798 A    2/2009
CN    102706069 A    10/2012
(Continued)

OTHER PUBLICATIONS

Cia Qing-Wen et al., "A Review of Super-Chilling Technology", Ood & Machinery, vol. 29, No. 6, Nov. 2013, 5 pages.
(Continued)

*Primary Examiner* — Brent T O'Hern
(74) *Attorney, Agent, or Firm* — Seed IP Law Group LLP (57) ABSTRACT

A non-freezing meat fresh-preservation control method, a controller and a refrigerator are provided. The non-freezing meat fresh-preservation control method includes: acquiring a current temperature of meat food in a compartment of a refrigerator in real time; judging whether the current temperature of the meat food is greater than or equal to a first temperature threshold $t_0$, and if yes, controlling the compartment to perform a cooling operation; judging whether the meat food is frozen during the cooling operation, and if yes, controlling the compartment to perform a heating
(Continued)

operation; and continuing the performance of the acquiring the current temperature after the performance of the heating operation is completed.

12 Claims, 6 Drawing Sheets

(58) Field of Classification Search
USPC .......................................................... 426/393
See application file for complete search history.

(56) References Cited

U.S. PATENT DOCUMENTS

| 8,677,770 | B2 | 3/2014 | Kim et al. |
| 10,772,454 | B2 | 9/2020 | Mendonça Vilela Pinto Ferreira et al. |
| 2010/0083687 | A1 | 4/2010 | Handa et al. |
| 2015/0323237 | A1* | 11/2015 | Kim .......................... F25C 1/00 62/340 |
| 2021/0156610 | A1* | 5/2021 | Gong ....................... A23L 3/365 |
| 2021/0164727 | A1* | 6/2021 | Gong ....................... A23L 3/001 |

FOREIGN PATENT DOCUMENTS

| CN | 103175375 A | 6/2013 |
| CN | 104729190 A | 6/2015 |
| CN | 106461304 A | 2/2017 |
| CN | 104833169 B | 5/2020 |
| JP | 4-43276 A | 2/1992 |
| JP | 2001-4260 A | 1/2001 |
| JP | 2001001260 A | 1/2001 |
| JP | 2006-234365 A | 9/2006 |
| JP | 2007-113818 A | 5/2007 |
| JP | 2007271152 A | 10/2007 |
| JP | 2009-30934 A | 2/2009 |
| JP | 2009030934 A | 2/2009 |
| JP | 2010-261677 A | 11/2010 |
| JP | 4948562 B2 | 6/2012 |
| KR | 10-2009-0028362 A | 3/2009 |
| WO | 2009035194 A2 | 3/2009 |

OTHER PUBLICATIONS

Kaale et al., "Superchilling of Food: A Review", Journal of Food Engineering, 107 (2011) pp. 141-146.

* cited by examiner

ICE-FREE MEAT FRESH-PRESERVATION CONTROL METHOD, CONTROLLER, AND REFRIGERATOR

CROSS-REFERENCE TO RELATED APPLICATION

The present application claims priority to Chinese patent application No. 2017103230155 filed on May 9, 2017, entitled "Non-freezing Meat Fresh-preservation Control Method, Controller and Refrigerator", which is incorporated herein by reference in its entirety.

BACKGROUND

Technical Field

This disclosure relates to the field of intelligent control, and in particular to a non-freezing meat fresh-preservation control method, a controller and a refrigerator.

Description of the Related Art

With the popularity of refrigerators, people are getting more and more used to keeping food fresh and storing it using the refrigerators in order to prolong the fresh-preservation and storage period of food, especially for meat food.

Currently, the fresh-preservation control methods for meat mainly include the following:

(1) directly placing meat into a freezing compartment, freezing at −18° C. for storing in which the meat generally can be stored for several months, but one of the most serious problems is that it is inconvenient to be thawed, and the quality and taste of the thawed meat are significantly reduced;

(2) storing by soft freezing in which the temperature of the compartment is generally between −5° C. to −9° C. at this time, and there is a problem that the meat is still frozen and it is difficult to be thawed although the meat also can be stored for a longer period under this condition; and (3) a zero-degree fresh-preservation technology being available in the market in which the temperature is controlled at about 1° C. and which has the problem that the fresh-preservation period is too short to ensure freshness for one-week although the problem of meat freezing can be avoided.

It can be seen that the existing fresh-preservation control methods for meat are not able to meet the actual needs of users.

BRIEF SUMMARY

In view of the defects in the prior art, the present disclosure provides a non-freezing meat fresh-preservation control method, a controller and a refrigerator. The non-freezing meat fresh-preservation control method, the controller and the refrigerator provided by the present disclosure can prolong the fresh-preservation period as much as possible while ensuring that the meat food is not frozen.

In order to solve the technical problems above, the present disclosure provides the following technical solutions:

according to a first aspect, the present disclosure provides a non-freezing meat cold preservation control method comprising:

S1, acquiring a current temperature of meat food in a compartment of a refrigerator in real time;

S2, judging whether the current temperature of the meat food is greater than or equal to a first temperature threshold $t_0$, and if yes, performing S3;

S3, controlling the compartment to perform a cooling operation;

S4, judging whether the meat food is frozen during the cooling operation, and if yes, performing S5, S5, controlling the compartment to perform a heating operation;

wherein after the performance of the S5 is completed, the performance of the S1 is continued.

Further, if it is judged that the current temperature of the meat food is less than the first temperature threshold $t_0$ in the S2, the S5 is then directly performed.

Further, if it is judged that the meat food has not been frozen yet during the cooling operation in the S4, the performance of the S3 is continued.

Further, the S4 specifically includes:

judging whether the meat food has a lowest temperature point during the cooling operation, and judging that the meat food is frozen during the cooling operation if the lowest temperature point occurs and the temperature elevation amount in a preset continuous time period starting from the lowest temperature point is greater than or equal to a preset temperature change amount; wherein the length of the preset continuous time period starting from the lowest temperature point is less than or equal to a first time length threshold;

and/or, judging whether a case that the temperature of the meat food remains unchanged during a preset continuous time period occurs during the cooling operation, and if yes, judging that the meat food is frozen during the cooling operation, wherein the length of the preset continuous time period is greater than or equal to a second time length threshold.

Further, the S1 specifically includes:

acquiring the current temperature of the meat food in the compartment of the refrigerator using a plurality of temperature sensors in real time;

correspondingly, the S4 specifically includes:

simultaneously judge whether the meat food is frozen during the cooling operation using a plurality of temperature sensors and take the judgment result of the temperature sensor judging that the meat food has been frozen during the cooling operation at the first time as the criterion.

Further, the S3 specifically includes:

controlling the compartment to perform the cooling operation according to an initial target temperature $T_0$, and the initial target temperature $T_0$ ranging from −10 to −1° C.

Further, the S3 specifically includes:

controlling the compartment to perform a cooling operation according to a first target temperature $T_1$, and continuously controlling the compartment to perform a cooling operation according to a second target temperature $T_2$ after the current temperature of the meat food has been cooled down to $t_0$, $T_1<T_2$.

Further, the S3 specifically includes:

controlling a damper of the compartment to be fully opened and performing the cooling operation according to an initial target temperature $T_0$, and controlling the damper of the compartment to be half-opened and continuously performing the cooling operation according to the initial target temperature $T_0$ after the current temperature of the meat food has been cooled down to $t_0$.

Further, the S5 specifically includes:
controlling the compartment to perform the heating operation according to a third target temperature $T_3$, and the third target temperature $T_3$ ranging from $-1°$ C. to $6°$ C.

Further, the first temperature threshold $t_0$ ranges from $-2°$ C. to $4°$ C.

Further, the compartment is one or more of the following:
a variable temperature chamber of the refrigerator or a variable temperature region isolated by the variable temperature chamber, a variable temperature drawer in a refrigerating compartment of the refrigerator or a variable temperature region isolated by the variable temperature drawer, and a variable temperature drawer in a freezing compartment of the refrigerator or a variable temperature region isolated by the variable temperature drawer.

Further, the control method further includes:
sending a reminder information to a user if it is judged that the storage time of the meat food in the compartment of the refrigerator exceeds a preset number of days.

According to a second aspect, the present disclosure also provides a controller, including:
a temperature acquisition module configured to acquire a current temperature of meat food in a compartment of a refrigerator in real time;
a first judgment module configured to judge whether the current temperature of the meat food is greater than or equal to a first temperature threshold $t_0$;
a first control module configured to control the compartment to perform a cooling operation when the first judgment module judges that the current temperature of the meat food is greater than or equal to the first temperature threshold $t_0$;
a second judgment module configured to judge whether the meat food is frozen during the cooling operation.
a second control module configured to control the compartment to perform a heating operation when the second judgment module judges that that the meat is frozen during the cooling operation.

Further, the second control module is further configured to control the compartment to perform a heating operation when the first judgment module judges that the current temperature of the meat food is less than the first temperature threshold $t_0$.

Further, the first control module is further configured to continuously control the compartment to perform the cooling operation when the second judgment module judges that the meat food has not been frozen yet during the cooling operation.

Further, the second judgment module is specifically configured to:
judge whether the meat food has a lowest temperature point during the cooling operation, and judge that the meat food is frozen during the cooling operation if the lowest temperature point occurs and the temperature elevation amount in a preset continuous time period starting from the lowest temperature point is greater than or equal to a preset temperature change amount; wherein the length of the preset continuous time period starting from the lowest temperature point is less than or equal to a first time length threshold;

and/or
judge whether a case that the temperature of the meat food remains unchanged during a preset continuous time period occurs during the cooling operation, and if yes, judge that the meat food is frozen during the cooling operation, wherein the length of the preset continuous time period is greater than or equal to a second time length threshold.

Further, the temperature acquisition module is specifically configured to:
acquire the current temperature of the meat food in the compartment of the refrigerator using a plurality of temperature sensors in real time;
correspondingly, the second judgment module is specifically configured to:
simultaneously judge whether the meat food is frozen during the cooling operation using a plurality of temperature sensors and take the judgment result of the temperature sensor judging that the meat food has been frozen during the cooling operation at the first time as the criterion.

Further, when the first control module controls the compartment to perform the cooling operation, it is specifically configured to:
control the compartment to perform the cooling operation according to an initial target temperature $T_0$, and the initial target temperature $T_0$ ranges from $-10$ to $-1°$ C.

Further, when the first control module controls the compartment to perform the cooling operation, it is specifically configured to:
control the compartment to perform a cooling operation according to a first target temperature $T_1$, and continuously control the compartment to perform a cooling operation according to a second target temperature $T_2$ after the current temperature of the meat food has been cooled down to $t_0$, $T_1<T_2$.

Further, when the first control module controls the compartment to perform the cooling operation, it is specifically configured to:
control a damper of the compartment to be fully opened and performing the cooling operation according to an initial target temperature $T_0$, and control the damper of the compartment to be half-opened and continuously perform the cooling operation according to the initial target temperature $T_0$ after the current temperature of the meat food has been cooled down to $t_0$.

Further, when the second control module controls the compartment to perform the heating operation, it is specifically configured to:
control the compartment to perform the heating operation according to a third target temperature $T_3$, and the third target temperature $T_3$ ranges from $-1°$ C. to $6°$ C.

Further, the first temperature threshold $t_0$ ranges from $-2°$ C. to $4°$ C.

Further, the compartment is one or more of the following:
a variable temperature chamber of the refrigerator or a variable temperature region isolated by the variable temperature chamber, a variable temperature drawer in a refrigerating compartment of the refrigerator or a variable temperature region isolated by the variable temperature drawer, and a variable temperature drawer in a freezing compartment of the refrigerator or a variable temperature region isolated by the variable temperature drawer.

Further, the controller further includes:
a reminding module configured to send a reminder information to a user if it is determined that the storage time of the meat food in the compartment of the refrigerator exceeds a preset number of days.

According to a third aspect, the present disclosure provides a refrigerator, comprising the controller of any of the embodiments above.

It can be known from the technical solutions above that the non-freezing meat fresh-preservation control method provided by the present disclosure detects the temperature of the meat food placed in the compartment in real time, controls the compartment to perform a low-temperature operation to cool the meat food if the temperature of the meat food is greater than or equal to the first temperature threshold $t_0$ (for example, the meat food is normal temperature meat), meanwhile immediately elevates a set temperature of the compartment if it is detected that the meat food is frozen during the operation of cooling the meat food, to decrease the refrigerating capacity so that the meat food is thawed; and it is necessary to detect the temperature of the meat food in real time when the meat food is gradually warmed up due to the decrease in the cooling amount, and re-control the compartment to perform a low-temperature operation to cool the meat food if it is detected that the temperature of the meat food is greater than or equal to the first temperature threshold $t_0$ again. It can be seen that the disclosure continuously repeats the processes of cooling and warming to ensure that the meat food is in a low temperature environment for a long time without being frozen, so that the fresh-preservation period of the meat food is prolonged. By adopting the control method of the present disclosure, the shelf life of the meat can be prolonged to more than 7 days, and non-freezing and fresh-preservation effects can be achieved. Therefore, the control method provided by the present disclosure may prolong the fresh-preservation period as much as possible while ensuring that the meat food is not frozen.

BRIEF DESCRIPTION OF THE DRAWINGS

In order to more clearly illustrate the technical solutions disclosed in the embodiments of the present disclosure or the prior art, the drawings used in the descriptions of the embodiments or the prior art will be briefly described below. Obviously, the drawings in the following description are only certain embodiments of the present disclosure, and other drawings can be obtained according to these drawings without any creative work for those skilled in the art.

DETAILED DESCRIPTION

In order to make the object, technical solutions and advantages of the embodiments of the present disclosure more clear, the technical solutions in the embodiments of the present disclosure are clearly and completely described in the following in conjunction with the accompanying drawings in the embodiments of the present disclosure. Obviously, the described embodiments are part of the embodiments of the present disclosure, and not all of the embodiments. All other embodiments obtained by a person of ordinary skill in the art based on the embodiments of the present disclosure without any creative work belong to the scope of the present disclosure.

Figure 1:
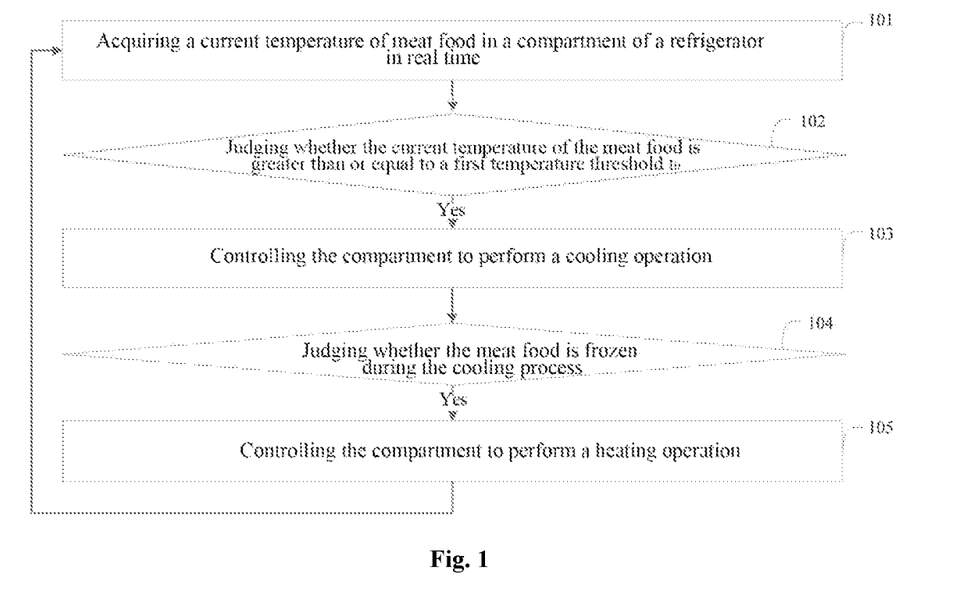
FIG. 1 is a flow chart of a non-freezing meat fresh-preservation control method according to an embodiment of the present disclosure.

An embodiment of the present disclosure provides a flow chart of a non-freezing meat fresh-preservation control method. Referring to FIG. 1, the method includes the following steps.

Step 101: a current temperature of meat food in a compartment of a refrigerator is acquired in real time.

In this step, the compartment may be a variable temperature chamber of the refrigerator, a variable temperature drawer in a refrigerating compartment of the refrigerator or a variable temperature drawer in a freezing compartment of the refrigerator. Of course, in order to make more reasonable use of the refrigerator space, the variable temperature chamber of the refrigerator, the variable temperature drawer in the refrigerating compartment of the refrigerator, or the variable temperature drawer in the freezing compartment of the refrigerator may be isolated into a plurality of variable temperature regions, so that each variable temperature region isolated can also be regarded as a compartment. That is, the compartment in this embodiment may be understood as multiple spaces as long as the temperature environment in the compartment is adjustable (for example, a temperature environment of −10 to 8° C. can be achieved).

It can be understood that when the variable temperature chamber of the refrigerator, the variable temperature drawer in the refrigerating compartment of the refrigerator, or the variable temperature drawer in the freezing compartment of the refrigerator are isolated into a plurality of variable temperature regions, an air supply and return structure can be separately provided for each region (multiple individual dampers or many-driven-by-one damper design can be used), or a size-fine-tunable baffle structure that can slide towards the left or right can also be flexibly designed so that users can adjust the size of each region; in addition, the temperature detection and cooling control of each region can be performed completely independently.

In this step, the meat food in the compartment of the refrigerator may be meat such as chicken, pork, duck, beef, fish, and the like.

Step 102: whether the current temperature of the meat food is greater than or equal to a first temperature threshold $t_0$ is judged, and if yes, 103 is then performed.

In this step, the first temperature threshold $t_0$ may range from −2° C. to 4° C.

Step 103: the compartment is controlled to perform a cooling operation.

In this step, the compartment is controlled to perform the cooling operation to cool the meat food if it is judged that the current temperature of the meat food is greater than or equal to a first temperature threshold $t_0$ (for example, the meat is normal temperature meat).

It can be understood that when the compartment is controlled to perform the cooling operation, the temperature of the compartment can be set as needed, for example, set to −8° C., that is, the compartment is controlled to perform the cooling operation with −8° C. as the target temperature. Of course, in order to ensure that a freezing or phase transformation of the meat food can occur during the cooling operation, the target temperature set herein during the cooling operation of the compartment cannot be excessively high, and should be at least a temperature below zero, preferably −10° C. to −1° C.

Step 104, whether the meat food is frozen during the cooling operation is judged, and if yes, step 105 is performed.

Step 105: the compartment is controlled to perform a heating operation.

In this step, a set temperature of the compartment is immediately elevated if it is detected that the meat food is frozen during the operation of cooling the meat food, to decrease the refrigerating capacity so that the meat food is thawed.

It can be understood that when the compartment is controlled to perform the heating operation, the temperature of the compartment can be set as needed, for example, set to 2° C., that is, the compartment is controlled to perform the heating operation with 2° C. as the target temperature.

Wherein, after the performance of the step 105 is completed, the performance of the step 101 is continued.

It can be understood that it is necessary to detect the current temperature of the meat food in real time during the performance of the warming operation of the step 105, and re-control the compartment to perform a low-temperature operation to cool the meat food if it is detected that the current temperature of the meat food is greater than or equal to the first temperature threshold $t_0$ again. Therefore, the embodiment continuously repeats the processes of cooling and warming to ensure that the meat food is in a low temperature environment for a long time without being frozen, so that the fresh-preservation period of the meat food is prolonged.

Figure 2:
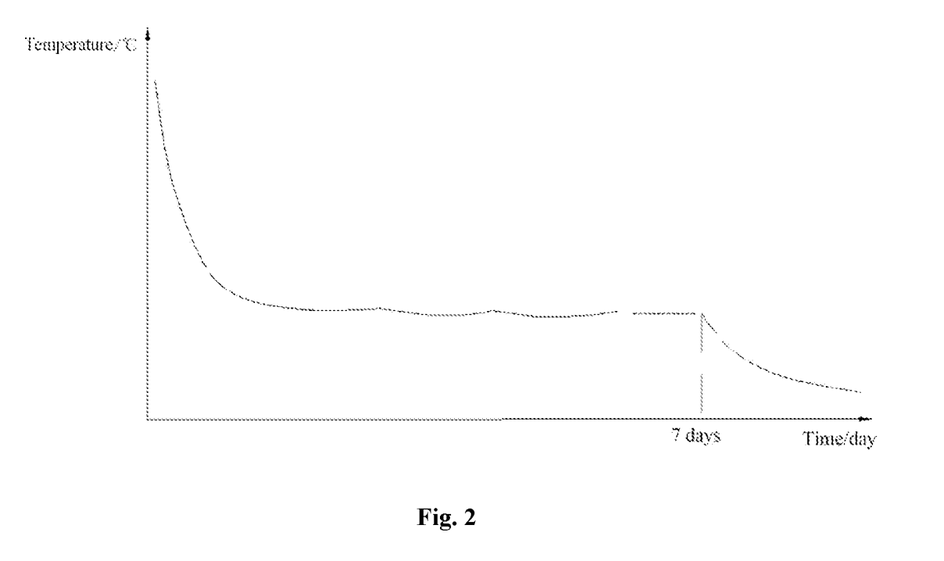
FIG. 2 is a schematic diagram showing a temperature change curve obtained after normal temperature meat is placed in a compartment using the non-freezing meat fresh-preservation control method according to an embodiment of the present disclosure.

Referring to FIG. 2, which is a schematic diagram showing a temperature change curve obtained after normal temperature meat is placed in a compartment using the non-freezing meat fresh-preservation control method according to an embodiment of the present disclosure. It can be seen from FIG. 2 that the non-freezing meat fresh-preservation control method provided by the embodiment of the present disclosure can make the meat food in a low temperature environment for a long time without being frozen, and can effectively prolong the fresh-preservation period of the meat food compared with the prior art.

For example, by adopting the control method of the embodiments of the present disclosure, the shelf life of the meat can be prolonged up to 7 days, and the non-freezing and fresh-preservation period prolonging effects can be achieved. It can be understood that the temperature change curve after 7 days in FIG. 2 (the rapid drop section of the end portion in FIG. 2) is not obtained by the control method described in the embodiment of the present disclosure, but the meat food is frozen for preservation. It can be understood that if the meat food has not been eaten after it is preserved for 7 days without being frozen using the control method described in this embodiment, it is generally recommended to carry out deep frozen preservation to prevent the deterioration of the meat food.

It can be understood that, in this embodiment, at least two temperature detection devices are needed in the compartment, and the temperature detection device may be an ordinary temperature sensor, an infrared sensor, or any other device capable of detecting temperature. One temperature detection device is used to monitor the temperature of the placed meat, and the other temperature detection device is used to control the temperature of the compartment.

In addition, the control method provided by the embodiment of the present disclosure can also be applied to a liquid beverage, so that the liquid beverage can always maintain at about 0° C., that is, it is always in a cool and non-frozen state, thereby meeting the demand of some users for ice cold drinks.

It can be known from the technical solutions above that the non-freezing meat fresh-preservation control method provided by the embodiments of the present disclosure detects the temperature of the meat food placed in the compartment in real time, controls the compartment to perform a low-temperature operation to cool the meat food if the temperature of the meat food is greater than or equal to the first temperature threshold $t_0$ (for example, the meat food is normal temperature meat), meanwhile immediately elevates a set temperature of the compartment if it is detected that the meat food is frozen during the operation of cooling the meat food, to decrease the refrigerating capacity so that the meat food is thawed; and it is necessary to detect the temperature of the meat food in real time when the meat food is gradually warmed up due to the decrease in the cooling amount, and re-control the compartment to perform a low-temperature operation to cool the meat food if it is detected that the temperature of the meat food is greater than or equal to the first temperature threshold $t_0$ again. Thus, the embodiment continuously repeats the processes of cooling and warming to ensure that the meat food is in a low temperature environment for a long time without being frozen, so that the fresh-preservation period of the meat food is prolonged. By adopting the control method of the embodiments of the present disclosure, the shelf life of the meat can be prolonged to more than 7 days, and non-freezing and fresh-preservation effects can be achieved. Therefore, the control method provided by the embodiments of the present disclosure may prolong the fresh-preservation period as much as possible while ensuring that the meat food is not frozen.

Figure 3:
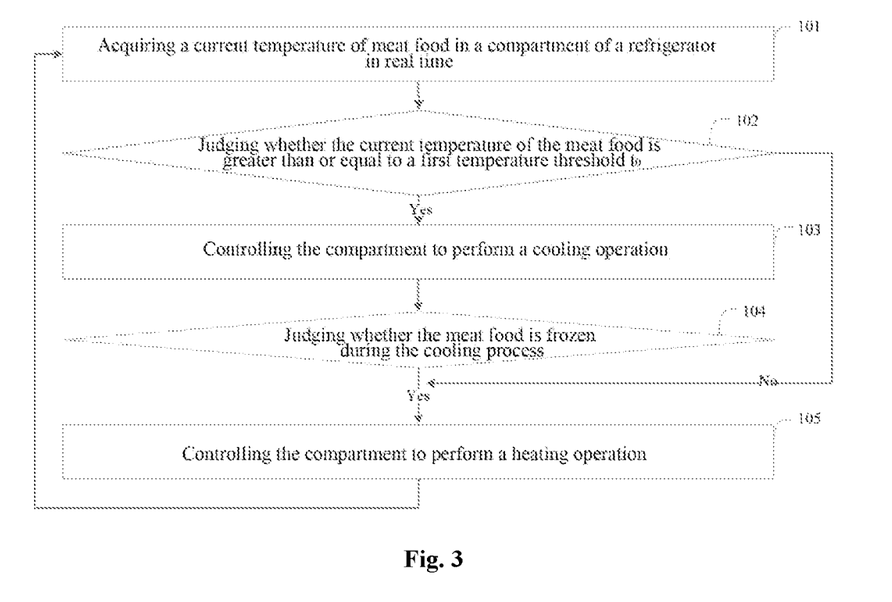
FIG. 3 is a flow chart of a non-freezing meat fresh-preservation control method in a first alternative implementation according to an embodiment of the present disclosure.

In an alternative embodiment, referring to FIG. 3, if it is judged that the current temperature of the meat food is less than the first temperature threshold $t_0$ in the step 102, then the step 105 is directly performed.

It can be seen that in the alternative implementation, the temperature of the meat food in the compartment is detected in real time, and the compartment is controlled to perform a low-temperature operation to cool the meat food if the temperature of the meat food is greater than or equal to the first temperature threshold $t_0$ (for example, the meat food is normal temperature meat); the compartment is controlled to perform high-temperature thawing so as to prevent the meat food from continuing freezing if the temperature of the meat food is lower than the first temperature threshold $t_0$ (for example, the meat food is frozen meat). When the meat food is subjected to high-temperature thawing, it is necessary to detect the temperature of the meat food in real time, and if the temperature of the meat food is again greater than or equal to the first temperature threshold $t_0$, the compartment is re-controlled to perform the low-temperature operation to cool the meat food. Thus, the embodiment continuously repeats the processes of cooling and warming to ensure that the meat food is in a low temperature environment for a long time without being frozen, so that the fresh-preservation period of the meat food is prolonged. When the compartment is controlled to perform the heating operation, the target temperature of the heating operation should not be excessively high, so as to prevent the warming temperature of the meat food in the compartment from being too high, and it is preferable that the value range of the target temperature during the heating operation is −1 to 6° C., for example, 3° C.

Figure 4:
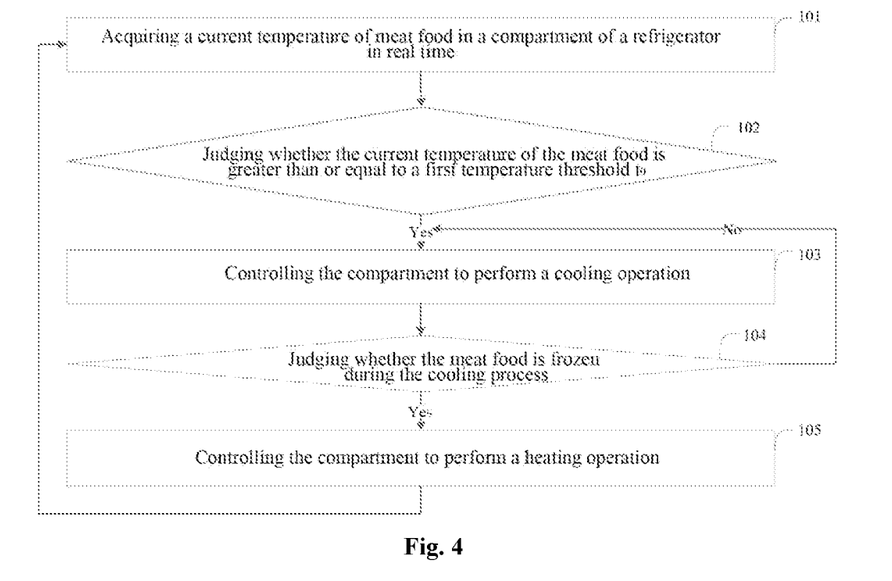
FIG. 4 is a flow chart of a non-freezing meat fresh-preservation control method in a second alternative implementation according to an embodiment of the present disclosure.

In an alternative implementation, referring to FIG. 4, if it is judged that the meat food has not been frozen yet during the cooling operation in the step 104, the performance of the step 103 is then continued.

In the alternative implementation, if it is judged that the meat food has not been frozen yet during the cooling operation in the step 104, it means that the temperature of the meat food is insufficiently cooled and it is necessary to continue the performance of the step 103 to continuously cool the meat food down.

It can be understood that the two alternative implementations of FIGS. 3 and 4 can be used in combination, and in this case, no further details are provided herein.

In an alternative implementation, whether the meat food is frozen during the cooling operation can be judged in the step 104 by using any one or both of the following two judgment modes:

mode 1: judging whether the meat food has a lowest temperature point during the cooling operation, and judging that the meat food is frozen during the cooling operation if the lowest temperature point occurs and the temperature elevation amount in a preset continuous time period starting from the lowest temperature point is greater than or equal to a preset temperature change amount (the preset temperature change amount ranging from 1 to 2° C.); wherein the length of the preset continuous time period starting from the lowest temperature point is less than or equal to a first time length threshold. For example, the first time length threshold ranges from 5 to 10 minutes.

It should be understood that the lowest temperature point described herein refers to the lowest temperature point before the temperature of the meat food is elevated during the freezing operation. Because the temperature of the meat food suddenly has a slightly higher temperature during the freezing operation and then continues to drop, the temperature point ahead of the point of this slightly higher temperature is the lowest point described here, which can also be understood as a pole.

Mode 2: judging whether a case that the temperature of the meat food remains unchanged during a preset continuous time period occurs during the cooling operation, and if yes, judging that the meat food is frozen during the cooling operation, wherein the length of the preset continuous time period is greater than or equal to a second time length threshold. For example, the second time length threshold ranges from 0.5 to 2 hours.

It can be understood that the two modes above are used to actually judge the freezing nodes in the two cases that the meat is in an overcooled state and in a non-overcooled state during the cooling operation.

It can be further understood that the cooling termination point in this embodiment is the phase transformation sudden-rise point of the temperature (the mode 1 above) or the phase transformation stable section (the mode 2 above).

Figure 5:
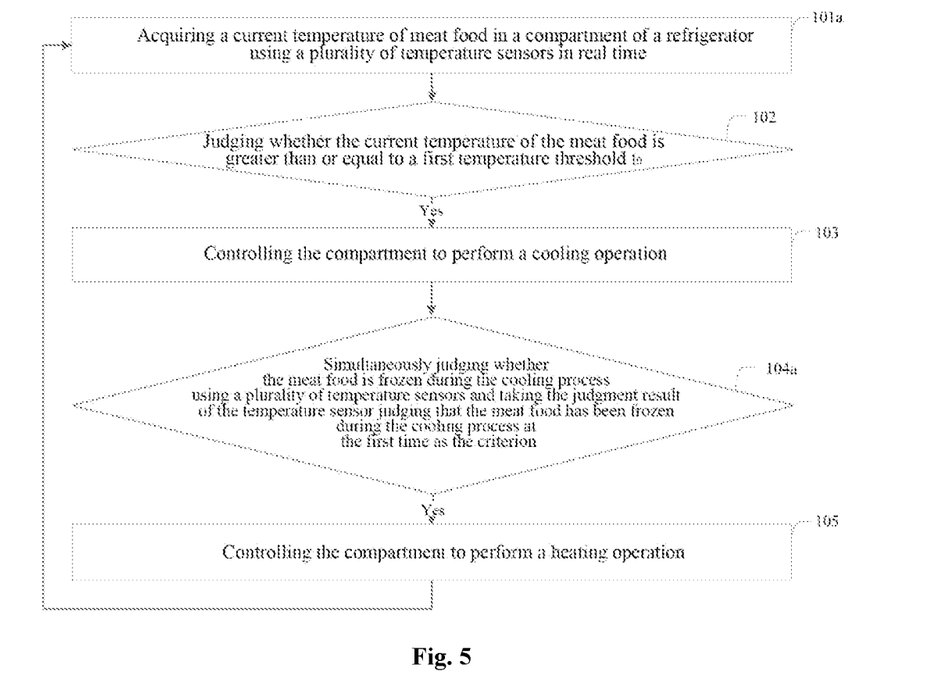
FIG. 5 is a flow chart of a non-freezing meat fresh-preservation control method in a third alternative implementation according to an embodiment of the present disclosure.

In an alternative implementation, referring to FIG. 5, when the current temperature of the meat food in the compartment of the refrigerator is acquired in real time in the step 101, the step 101 specifically includes:

step 101a: acquiring the current temperature of the meat food in the compartment of the refrigerator using a plurality of temperature sensors in real time;

correspondingly, the judging whether the meat food is frozen during the cooling operation in the step 104 specifically includes:

step 104a: simultaneously judging whether the meat food is frozen during the cooling operation using a plurality of temperature sensors and taking the judgment result of the temperature sensor judging that the meat food has been frozen during the cooling operation at the first time as the criterion.

It can be seen that in the alternative implementation, a plurality of temperature sensors are used to judge whether the meat food is frozen during the cooling operation to ensure that the freezing phenomenon of the meat food can be accurately and timely discovered. When a certain temperature sensor judges that the meat food is frozen during the cooling operation at the first time, the subsequent warming process is performed immediately to ensure that the meat food is not frozen by taking the judgment result of this temperature sensor as a criterion.

In addition, during the entire control process, the plurality of temperature sensors can always compare the temperatures. If temperatures detected by more than two temperature sensors are below a certain value (for example, −10° C.), it means that there is a large amount of frozen meat placed into the compartment, and it is necessary to forcibly perform the step 105 to control the warming at this time.

Figure 6:
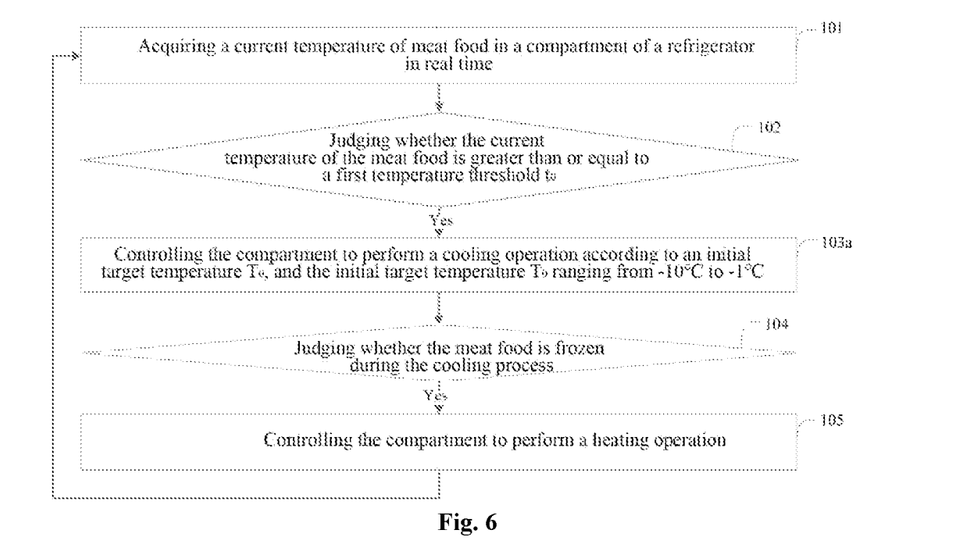
FIG. 6 is a flow chart of a non-freezing meat fresh-preservation control method in a fourth alternative implementation according to an embodiment of the present disclosure.

In an alternative implementation, referring to FIG. 6, the step 103 specifically includes:

step 103a: controlling the compartment to perform a cooling operation according to an initial target temperature $T_0$, and the initial target temperature $T_0$ ranging from −10° C. to −1° C.

In the present implementation, the compartment is controlled to perform a cooling operation according to the initial target temperature $T_0$ to ensure that the meat in the compartment is quickly cooled to a frozen state to keeping the fresh component as much as possible.

Figure 7:
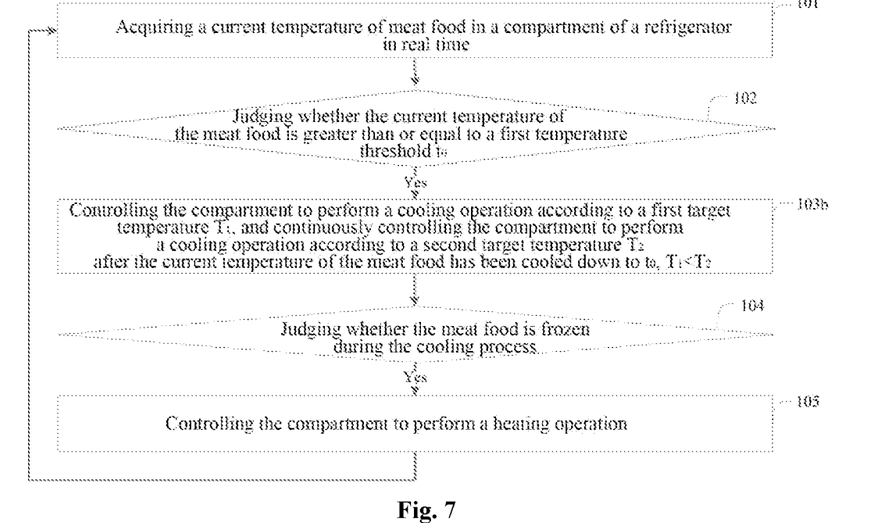
FIG. 7 is a flow chart of a non-freezing meat fresh-preservation control method in a fifth alternative implementation according to an embodiment of the present disclosure.

In another alternative implementation, different from the alternative embodiments above, referring to FIG. 7, the step 103 specifically includes:

step 103b: controlling the compartment to perform a cooling operation according to a first target temperature $T_1$, and continuously controlling the compartment to perform a cooling operation according to a second target temperature $T_2$ after the current temperature of the meat food has been cooled down to $t_0$, $T_1 < T_2$.

Unlike the alternative implementation above, in the present implementation, the cooling operation is divided into two stages, and the target temperature setting value is controlled so that earlier stage of the cooling operation operates at a lower temperature and the cooling amount is larger, the meat food is quickly brought to the to level, and then the set temperature is elevated, so that the meat food slowly enters the overcooled or freezing process, thereby effectively prolonging the storage time at low temperatures.

Figure 8:
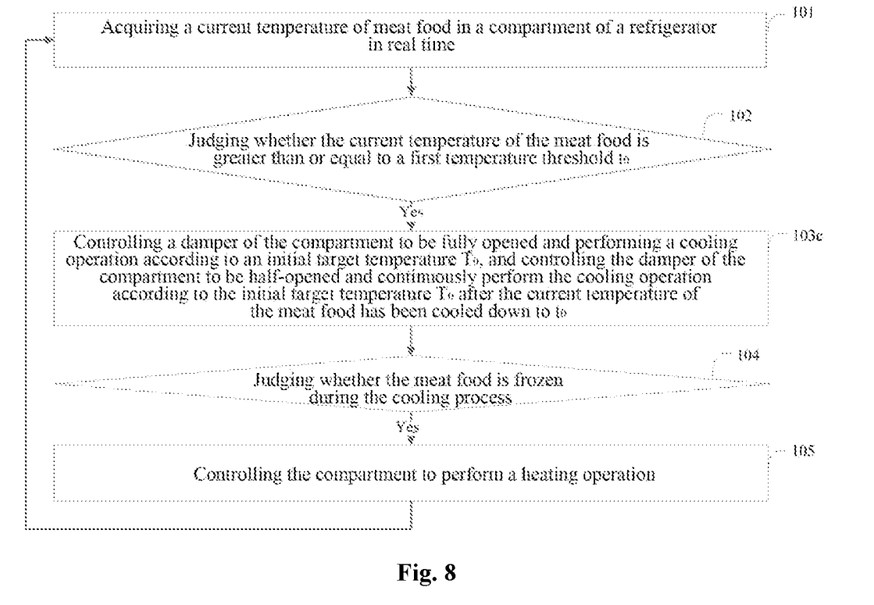
FIG. 8 is a flow chart of a non-freezing meat fresh-preservation control method in a sixth alternative implementation according to an embodiment of the present disclosure.

In still another alternative implementation, unlike two alternative embodiments above, referring to FIG. 8, the step 103 specifically includes:

step 103c: controlling a damper of the compartment to be fully opened and performing a cooling operation according to an initial target temperature $T_0$, and controlling the damper of the compartment to be half-opened and continuously perform the cooling operation according to the initial target temperature $T_0$ after the current temperature of the meat food has been cooled down to $t_0$.

Unlike the two alternative implementation above, in the present embodiment, the cooling operation is divided into two stages, and the damper of the compartment is controlled to be fully opened and half-opened so that the cooling amount at the earlier stage of the cooling operation is larger, the meat food is quickly brought to the to level, and then the damper is controlled to be half-opened, so that the cooling amount is decreased, the meat food slowly enters the overcooled or freezing process, thereby effectively prolonging the storage time at low temperatures.

Figure 9:
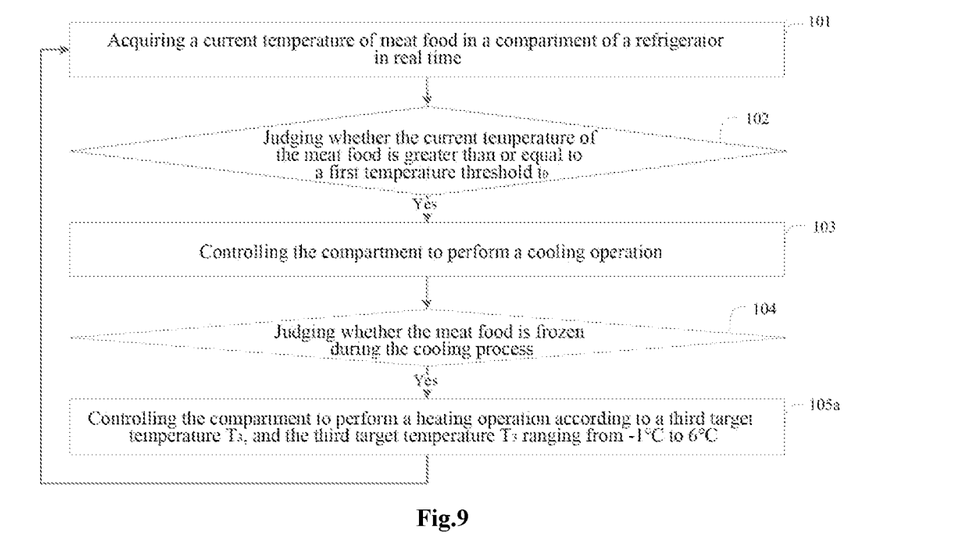
FIG. 9 is a flow chart of a non-freezing meat fresh-preservation control method in a seventh alternative implementation according to an embodiment of the present disclosure.

In an alternative implementation, referring to FIG. 9, the step 105 specifically includes:

step 105a, controlling the compartment to perform a heating operation according to a third target temperature T3, and the third target temperature T3 ranging from −1° C. to 6° C.

In the present implementation, the compartment is controlled to perform a heating operation according to the third target temperature T3 to ensure that the meat food in the compartment is not excessively warmed.

Figure 10:
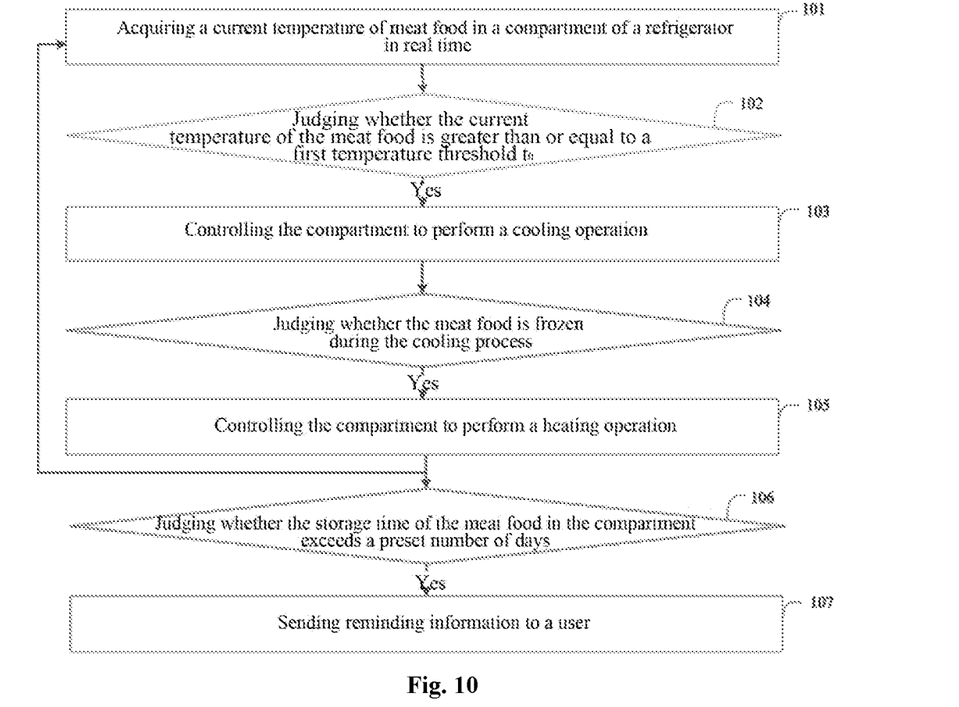
FIG. 10 is a flow chart of a non-freezing meat fresh-preservation control method in an eighth alternative implementation according to an embodiment of the present disclosure.

In an alternative implementation, referring to FIG. 10, the method also includes step 106 and step 107.

Step 106: whether the storage time of the meat food in the compartment exceeds a preset number of days is judged, and if yes, then the step 107 is performed.

Step 107: a reminder information is sent to a user.

In this alternative embodiment, the user is reminded to take out the food in time for eating by sending the reminder information to the user after the storage time of the meat food in the compartment is judged. For example, when the user opens the compartment, there is a reminder signal such as an indicator light or blinking, or corresponding reminder information is directly displayed on the display screen. In addition, the reminder function can also be implemented through the mobile phone software, for example, the reminder information is pushed to the mobile phone software, and the user is informed of the reminder information through the mobile phone software.

It can be understood that the foregoing various alternative embodiments may be combined in any manner and the present disclosure does not limit this.

Figure 11:
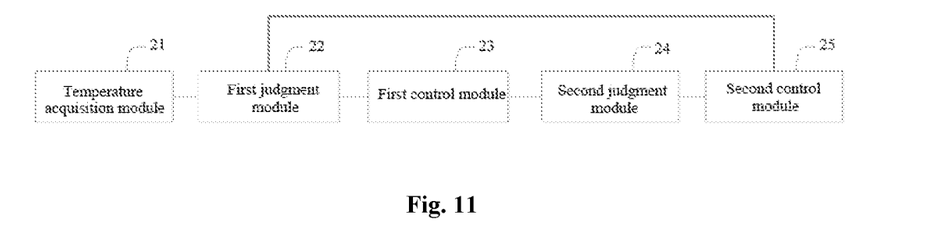
FIG. 11 is a schematic structural diagram of a controller according to another embodiment of the present disclosure.

Based on the same inventive concept, another embodiment of the present disclosure provides a controller. Referring to FIG. 11, the controller includes: a temperature acquisition module 21, a first judgment module 22, a first control module 23, a second judgment module 24 and a second control module 25, wherein:

the temperature acquisition module 21 is configured to acquire a current temperature of meat food in a compartment of a refrigerator in real time;

the first judgment module 22 is configured to judge whether the current temperature of the meat food is greater than or equal to a first temperature threshold $t_0$;

the first control module 23 is configured to control the compartment to perform a cooling operation when the first judgment module judges that the current temperature of the meat food is greater than or equal to the first temperature threshold $t_0$;

the second judgment module 24 is configured to judge whether the meat food is frozen during the cooling operation; and the second control module 25 is configured to control the compartment to perform a heating operation when the second judgment module judges that the meat is frozen during the cooling operation.

In an alternative implementation, the second control module 25 is further configured to control the compartment to perform a heating operation when the first judgment module 22 judges that the current temperature of the meat food is less than the first temperature threshold $t_0$.

In an alternative implementation, the first control module 23 is further configured to continuously control the compartment to perform the cooling operation when the second judgment module 24 judges that the meat food has not been frozen yet during the cooling operation.

In an alternative implementation, the second judgment module 24 is specifically configured to:

judge whether the meat food has a lowest temperature point during the cooling operation, and judge that the meat food is frozen during the cooling operation if the lowest temperature point occurs and the temperature elevation amount in a preset continuous time period starting from the lowest temperature point is greater than or equal to a preset temperature change amount; wherein the length of the preset continuous time period starting from the lowest temperature point is less than or equal to a first time length threshold;

and/or, judge whether a case that the temperature of the meat food remains unchanged during a preset continuous time period occurs during the cooling operation, and if yes, judge that the meat food is frozen during the cooling operation, wherein the length of the preset continuous time period is greater than or equal to a second time length threshold.

In an alternative implementation, the temperature acquisition module 21 is specifically configured to:

acquire the current temperature of the meat food in the compartment of the refrigerator using a plurality of temperature sensors in real time;

correspondingly, the second judgment module 24 is specifically configured to:

simultaneously judge whether the meat food is frozen during the cooling operation using a plurality of temperature sensors and take the judgment result of the temperature sensor judging that the meat food has been frozen during the cooling operation at the first time as the criterion.

In an alternative implementation, when the first control module 23 controls the compartment to perform the cooling operation, it is specifically configured to:

control the compartment to perform the cooling operation according to an initial target temperature $T_0$, and the initial target temperature $T_0$ ranges from −10 to −1° C.

In an alternative implementation, when the first control module 23 controls the compartment to perform the cooling operation, it is specifically configured to:

control the compartment to perform a cooling operation according to a first target temperature $T_1$, and continuously control the compartment to perform a cooling operation according to a second target temperature $T_2$ after the current temperature of the meat food has been cooled down to $t_0$, $T_1 < T_2$.

In an alternative implementation, when the first control module 23 controls the compartment to perform the cooling operation, it is specifically configured to:

control a damper of the compartment to be fully opened and performing the cooling operation according to an initial target temperature $T_0$, and control the damper of the compartment to be half-opened and continuously perform the cooling operation according to the initial target temperature $T_0$ after the current temperature of the meat food has been cooled down to $t_0$.

In an alternative implementation, when the second control module 25 controls the compartment to perform the heating operation, it is specifically configured to:

control the compartment to perform the heating operation according to a third target temperature $T_3$, and the third target temperature $T_3$ ranges from −1° C. to 6° C.

In an alternative implementation, the first temperature threshold $t_0$ ranges from −2° C. to 4° C.

In an alternative implementation, the compartment is one or more of the following:

a variable temperature chamber of the refrigerator or a variable temperature region isolated by the variable temperature chamber, a variable temperature drawer in a refrigerating compartment of the refrigerator or a variable temperature region isolated by the variable temperature drawer, and a variable temperature drawer in a freezing compartment of the refrigerator or a variable temperature region isolated by the variable temperature drawer.

Figure 12:
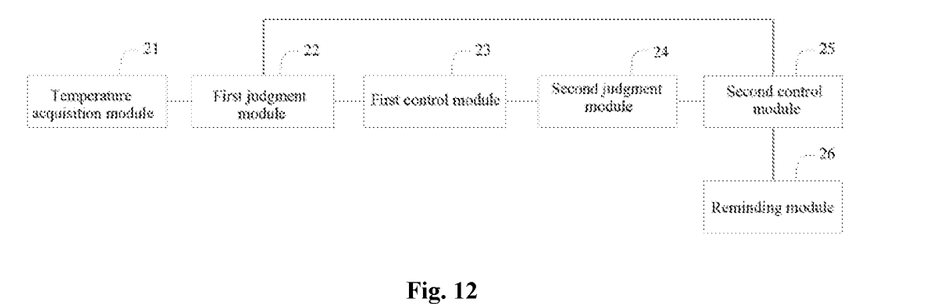
FIG. 12 is another schematic structural diagram of a controller according to another embodiment of the present disclosure.

In an alternative embodiment, referring to FIG. 12, the controller further includes:

a reminding module 26 configured to send a reminder information to a user if it is judged that the storage time of the meat food in the compartment of the refrigerator exceeds the preset number of days.

The controller of the embodiments of the present disclosure can be used to perform the non-freezing meat fresh-preservation control method described in the above embodiments, and the principle and technical effects thereof are similar and will not be described in detail herein.

Figure 13:
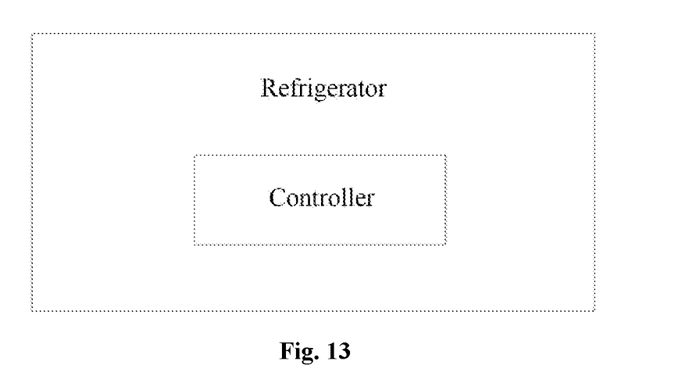
FIG. 13 is a schematic structural diagram of a refrigerator according to still another embodiment of the present disclosure.

Based on the same inventive concept, still another embodiment of the present disclosure provides a refrigerator, referring to FIG. 13, which includes the controller as described in the embodiments above.

Since the refrigerator provided by the embodiments of the disclosure includes the controller of the embodiments above, the refrigerator provided by the embodiments of the disclosure can prolong the fresh-preservation period as much as possible while ensuring that the meat is not frozen, thereby improving the user experience and meeting user needs.

The embodiments above are only used to explain the technical solutions of the present disclosure, and are not limited thereto; although the present disclosure is described in detail with reference to the foregoing embodiments, it should be understood by those skilled in the art that they can still modify the technical solutions described in the foregoing embodiments and make equivalent replacements to a part of the technical features; and these modifications and substitutions do not make the essence of the corresponding technical solutions depart from the spirit and scope of the technical solutions of the embodiments of the present disclosure.

The invention claimed is:

1. A controller in a refrigerator, comprising:
    a temperature acquisition module configured to acquire, from one or more temperature detecting devices, a first temperature of a piece of meat in a compartment of the refrigerator;
    a first judgment module configured to determine whether the first temperature of the piece of meat is greater than or equal to a first temperature threshold;
    a first control module configured to start a cooling operation on the compartment by controlling an opening state of a damper of the compartment when the first judgment module determines that the first temperature of the piece of meat is greater than or equal to the first temperature threshold;
    a second judgment module configured to determine whether the piece of meat is frozen during the cooling operation based on one or more of the first temperature being lower than a second threshold or a period of time during which the first temperature remains being longer than a third threshold; and
    a second control module configured to start a heating operation on the compartment when the second judgment module determines that the piece of meat is frozen during the cooling operation.

2. The controller of claim 1, wherein the second control module is further configured to control a heating operation on the compartment when the first judgment module determines that the first temperature of the piece of meat is less than the first temperature threshold.

3. The controller of claim 1, wherein the first control module is further configured to continuously control the cooling operation on the compartment when the second judgment module determines that the piece of meat has not been frozen during the cooling operation.

4. The controller of claim 1, wherein the second judgment module is configured to:
    determine that the piece of meat is frozen during the cooling operation if the piece of meat has a valley temperature point during the cooling operation and a temperature elevation amount in a first preset continuous time period starting from the valley temperature point is greater than or equal to a preset temperature change amount; and
    determine that the piece of meat is frozen during the cooling operation if a temperature of the piece of meat remains unchanged during a second preset continuous time period during the cooling operation.

5. The controller of claim 1, wherein the temperature acquisition module is configured to:
    acquire the first temperature of the piece of meat in the compartment of the refrigerator using a plurality of temperature sensors in real time; and
    the second judgment module is configured to:
    determine whether the piece of meat is frozen during the cooling operation using the plurality of temperature sensors and based on a first determination result of a temperature sensor of the plurality of temperature sensors indicating that the piece of meat has been frozen during the cooling operation.

6. The controller of claim 1, wherein when the first control module controls the cooling operation on the compartment, it is configured to:
control the cooling operation on the compartment according to an initial target temperature, the initial target temperature being in a range from about −10 to about −1° C.

7. The controller of claim 1, wherein when the first control module controls the cooling operation on the compartment, it is configured to:
control the cooling operation on the compartment according to a first target temperature, and continuously control the cooling operation on the compartment according to a second target temperature after a temperature of the piece of meat has been cooled down to the first temperature threshold, the first target temperature being lower than the second target temperature.

8. The controller of claim 1, wherein when the first control module controls the cooling operation on the compartment, it is configured to:
control a damper of the compartment to be fully opened and perform the cooling operation according to an initial target temperature, and control the damper of the compartment to be half-opened and continuously perform the cooling operation according to the initial target temperature after the a temperature of the piece of meat has been cooled down to the first temperature threshold.

9. The controller of claim 1, wherein when the second control module controls the heating operation on the compartment to perform, it is configured to:
control the heating operation on the compartment according to a third target temperature, the third target temperature being in a range from about −1° C. to about 6° C.

10. The controller according to claim 1, wherein the first temperature threshold is in a range from about −2 to about 4° C.

11. The controller of claim 1, wherein the compartment is one or more of:
a variable temperature chamber of the refrigerator or a variable temperature region isolated by the variable temperature chamber, a variable temperature drawer in a refrigerating compartment of the refrigerator or a variable temperature region isolated by the variable temperature drawer, and a variable temperature drawer in a freezing compartment of the refrigerator or a variable temperature region isolated by the variable temperature drawer.

12. The controller of claim 1, further comprising:
a reminding module configured to send a reminder information to a user through one or more of an indicator light coupled to the refrigerator or an user interface coupled to the refrigerator if it is judged that a storage time of the piece of meat in the compartment of the refrigerator exceeds a preset number of days.

* * * * *